United States Patent
Pickles (10) Patent No.: US 7,571,591 B2
(45) Date of Patent: Aug. 11, 2009

(54) TOW BEHIND MOWER ATTACHMENT SYSTEM

(76) Inventor: Tim Pickles, 463 Stage Rd., S. Otselic, NY (US) 13155

( * ) Notice: Subject to any disclaimer, the term of this patent is extended or adjusted under 35 U.S.C. 154(b) by 0 days.

(21) Appl. No.: 11/758,294

(22) Filed: Jun. 5, 2007

(65) Prior Publication Data
US 2008/0303246 A1 Dec. 11, 2008

(51) Int. Cl.
*A01D 75/30* (2006.01)
(52) U.S. Cl. .......................................................... 56/6
(58) Field of Classification Search ................ 56/6, 56/7; 180/411.1, 412, 472, 467; 172/314, 172/313; 414/483, 480; 280/789
See application file for complete search history.

(56) References Cited

U.S. PATENT DOCUMENTS

| | | | | | |
|---|---|---|---|---|---|
| 2,139,200 | A | * | 12/1938 | Moyer | 56/7 |
| 2,153,876 | A | * | 4/1939 | Roseman | 56/7 |
| 2,177,189 | A | * | 10/1939 | Roseman | 56/7 |
| 2,725,703 | A | * | 12/1955 | Roseman, Jr. | 56/7 |
| 2,955,848 | A | * | 10/1960 | Hyland et al. | 172/314 |
| 3,224,176 | A | * | 12/1965 | Taylor | 56/7 |
| 3,608,284 | A | * | 9/1971 | Erdman | 56/6 |
| 3,832,834 | A | * | 9/1974 | Kovacs | 56/6 |
| 4,079,960 | A | * | 3/1978 | Carson | 280/472 |
| 4,123,082 | A | | 10/1978 | Conner | |
| 4,135,349 | A | * | 1/1979 | Schwertner | 56/6 |
| 4,346,547 | A | * | 8/1982 | Allison | 56/13.6 |
| 4,430,848 | A | * | 2/1984 | Wistrom | 56/11.3 |
| 4,637,625 | A | | 1/1987 | Blackwell | |
| 4,662,646 | A | | 5/1987 | Schlapman et al. | |
| 4,744,580 | A | | 5/1988 | Ryan | |
| 4,815,259 | A | | 3/1989 | Scott | |
| 4,896,485 | A | | 1/1990 | Gordy | |
| 4,912,915 | A | * | 4/1990 | Smit | 56/6 |
| 5,069,022 | A | * | 12/1991 | Vandermark | 56/6 |
| 5,423,565 | A | | 6/1995 | Smith | |
| 5,851,020 | A | * | 12/1998 | Godwin et al. | 280/413 |
| 5,966,912 | A | | 10/1999 | Swisher et al. | |
| 6,347,503 | B1 | * | 2/2002 | Esau et al. | 56/15.9 |
| 6,739,612 | B2 | | 5/2004 | Colistro | |
| 6,830,114 | B2 | * | 12/2004 | Hammonds | 180/6.2 |
| 6,840,543 | B2 | * | 1/2005 | Dufty | 280/789 |
| 2004/0011014 | A1 | * | 1/2004 | Ward | 56/10.4 |
| 2004/0070172 | A1 | * | 4/2004 | Colistro | 280/472 |

* cited by examiner

*Primary Examiner*—Árpád Fábián-Kovács
(74) *Attorney, Agent, or Firm*—McGlew and Tuttle, P.C.

(57) ABSTRACT

A tow behind mower attachment system is provided comprising a push mower having a mower deck with four wheels including a right front wheel having a right front axle, a left front wheel having a left front axle, a right rear wheel having a right rear axle and a left rear wheel having a left rear axle. The push mower has surface features defined by the mower deck, the four wheels, the right front axle and the left front axle, the right rear axle and the left rear axle. An attachment assembly is provided having a caster mount and a caster wheel connected to the caster mount for pivoting relative to the attachment assembly. A push mower connector is provided engaging one or more of the surface features for connecting the attachment assembly to the push mower.

15 Claims, 7 Drawing Sheets

Fig. 7

TOW BEHIND MOWER ATTACHMENT SYSTEM

FIELD OF THE INVENTION

The present invention relates to a tow behind mower attachment system and more particularly to an attachment system for towing a standard push mower using a riding mower or similar towing vehicle.

BACKGROUND OF THE INVENTION

Arrangements to tow lawnmowers have been generally known. These can include arrangements for tractors that tow mower units that are particularly made to be towed. Also, systems and arrangements are known in which a riding mower or other tractor tows a push mower.

U.S. Pat. No. 6,739,612 discloses an offset arm for towing rotary mowers and the like. This setup includes a mower unit with a mower deck that has rear wheels and is connected in a front end for towing. The front end of the mower unit is supported by a tow arm which is itself supported by caster wheels that swivel about a vertical axis so as to follow the direction of a tractor towing the arrangement. The tow arm is connected to the hitch location of the tractor with an offset arrangement. The offset arrangement allows the mowing unit to mow a track which is offset from the path of the tractor. The apparatus prevents lateral movement with respect to the tow arm. The arrangement requires a mowing unit which is adapted only for being towed and which requires the tow bar for support.

U.S. Pat. No. 4,662,646 discloses a trailing mower and tow bar installation in which the tow bar has first and second members pivotally attached to the tractor. A universal joint connection attaches to the independent tow unit. This also requires a special independent mowing or trailing unit. U.S. Pat. No. 5,966,912 provides a special trailing mower and arrangement for towing by a tractor. These publications also require special mowing units and special features for being pulled by a riding mower.

U.S. Pat. No. 4,815,259 and U.S. Pat. No. 4,896,485 disclose tow assemblies that use a gang trailing arrangement. These devices require special connections and special arrangements for trailing the plural lawnmowers.

U.S. Pat. No. 4,744,580 and U.S. Pat. No. 5,423,565 provide hitch arrangements for a riding mower or tractor. In each case, the hitch arrangement includes a laterally extending member with pivot connections connecting to trailing mowers. These arrangements each require a large lateral connection member and further require special attachments for adapting lawnmowers to the arrangement.

U.S. Pat. No. 4,637,625 and U.S. Pat. No. 4,123,082 each disclose a tow hitch assembly for towing lawnmowers. Each of these arrangements require special mount connections for connecting the tractor to the trailing mower.

SUMMARY OF THE INVENTION

It is an object of the invention to provide a push mower attachment system for towing a standard push mower behind a tractor such as behind a riding mower in which the tow behind mower is a standard off-the-shelf push mower with no modifications as to the mowing device.

It is a further object of the invention to provide a push mower attachment system for a riding mower in which a push mower is not modified and is attached to the riding mower using an existing feature (a surface feature) of the push mower such as the wheel axles of the push mower or the mower housing or the wheels themselves so as to mow a greater area while simultaneously providing an easy connection/disconnection for the push mower, particularly to allow the push mower to be used independently and quickly reconnected for towing.

According to the invention, a tow behind mower attachment system is provided comprising a push mower having a mower deck with four wheels including a right front wheel having a right front axle, a left front wheel having a left front axle, a right rear wheel having a right rear axle and a left rear wheel having a left rear axle. The push mower has surface features defined by the mower deck, the four wheels, the right front axle and the left front axle, the right rear axle and the left rear axle. An attachment assembly is provided having a caster mount and a caster wheel connected to the caster mount for pivoting relative to the attachment assembly. A push mower connector is provided engaging one or more of the surface features for connecting the attachment assembly to the push mower.

The push mower connector means may advantageously engage one or more of the surface features for supporting an end of the push mower deck with at least two of the four wheels supported in a raised position off of the ground.

The attachment assembly may advantageously include a lateral member with the caster mount receiving the caster wheel and another caster mount connected to another caster wheel, a tow connection arm connected to the frame and having a tow connection end for attachment to a tow point of a riding mower, the tow connection arm having an adjustment region with a plurality of adjustment locations and a bracing arm connected to the frame and connected to one of the adjustment locations at the adjustment region of the tow connection arm for establishing an offset track of the push mower relative to the track of the riding mower.

The push mower connector means may include a right side lateral adjustment device for changing a right lateral mounting location on the frame within one of a plurality of lateral positions and a left side lateral adjustment device for changing a left lateral mounting location on the frame within one of a plurality of lateral positions.

According to a first embodiment, the push mower connector means comprises a right axle connection part mounted to the right lateral mounting location, the right axle connection part engaging the right axle of the push mower as the one or more of the surface features for connecting the frame to the push mower and a left axle connection part mounted to the left lateral mounting location, the left axle connection part engaging the left axle of the push mower as the one or more of the surface features for connecting the frame to the push mower. The right axle connection part and the left axle connection part may each comprise a bracket defining an axle receiving region with at least a lower wall and adjacent front and rear walls and a closure element articulated at one end to the bracket and with an opposite connection and for connection to the bracket to maintain the push mower axle in the axle receiving region.

According to a first embodiment, the push mower connector means comprises a right wheel connection part mounted to the right lateral mounting location, the right wheel connection part engaging the right wheel of the push mower as the one or more of the surface features for connecting the frame to the push mower and a left wheel connection part mounted to the left lateral mounting location, the left wheel connection part engaging the left wheel of the push mower as the one or more of the surface features for connecting the frame to the push mower. The right wheel connection part and the left wheel connection part may each comprise a bracket defining a wheel receiving region, a lower support connected to the bracket and another support connected to the bracket, the lower support and the another support cooperating to support a respective wheel in the wheel receiving region.

According to a first embodiment, the push mower connector means comprises a mower deck connection mounted to the attachment assembly, the mower deck connection engaging at least a lower edge of the mower deck as the one or more of the surface features for connecting the frame to the push mower. The mower deck connection may comprise a bracket defining a mower deck lower edge support and another support connected to the bracket, the deck lower edge support and the another support cooperating to support the mower deck on the frame.

The push mower may further include an extending handle with a right side attachment connected to the mower deck and with a left side attachment connected to the mower deck, an upper laterally extending handle part and a laterally extending safety bar movable between a safety position for disabling the push mower and an engaged position for operation of the push mower and the attachment system. A safety bar engagement device may be provided for maintaining the safety bar in the engaged position for operation of the push mower. The safety bar engagement device may comprise a cable connected to the safety bar and a connection point established along one of the attachment assembly, the mower deck or a part connected to the mower deck. The connection point is then connected to the cable for tensioning the cable for maintaining the safety bar in the engaged position for operation of the push mower. The safety bar engagement device may further comprise a spring connected to the cable between the connection point and the cable for applying a spring force to the safety bar in the engaged position for operation of the push mower.

An elastic member may be connected to the extending handle for maintaining tension on the extending handle.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
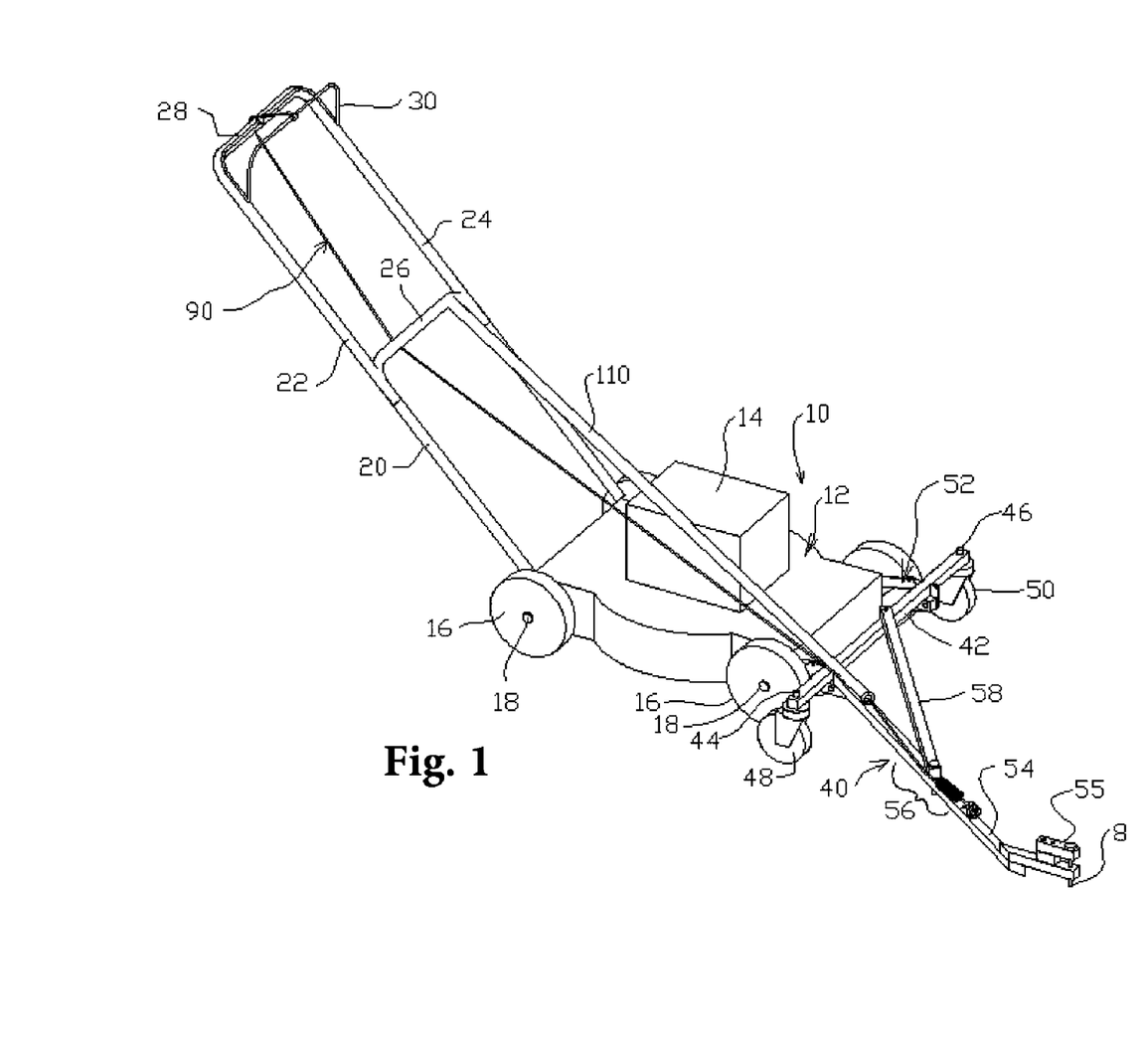
FIG. 1 is a perspective view showing a tow behind mower attachment system according to the invention, including a standard push mower.

Referring to the drawings in particular, FIG. 1 shows the overall layout of the tow behind mower attachment system according to the invention. The system is based on a standard push mower generally designated 10 that connects to a riding mower based on an attachment assembly generally designated 40. The riding mower includes a standard tow connection (tow point) and connects to the attachment assembly 40 via a vertical tow pin 8.

The standard push mower 10 includes a mower deck 12 supporting a motor (an internal combustion engine) 14 that drives a mowing blade in a standard manner. The mower deck 12 is supported by a right front wheel, left front wheel, right rear wheel and left rear wheel, each designated 16. The wheels 16 are in turn each connected to a wheel axle (right front, left front, right rear, left rear) 18. The wheels are typically adjustable relative to the mower deck 12 by changing the position of each axle 18. The push mower 10 also includes a rearwardly extending handle 20. The handle 20 has a right side with right side handle attachment 22 connected to the mower deck 12 and a left side with left side handle attachment 24 connected to the mower deck 12. The handle 20 has a middle laterally extending handle part 20 to provide support and strength. The handle 20 has an upper laterally extending handle part 28. The push mower 10 has a laterally extending safety bar 30 which is pivotally mounted to the handle 20 and is operatively connected to the mower 10. The safety bar 30 is spring biased into a nonoperative position, in which the motor 14 is nonoperative. During normal use, safety bar 30 is engaged and maintained in an engaged position (or an engaged position range) for operation of the motor 14 to allow operation of the push mower 10.

The attachment assembly 40 includes a laterally extending member 42. The lateral member 42 has a first caster mount (right side) 44 and a second caster mount (left side) 46. A first (right) caster wheel 48 is connected to the lateral member 42 via the mount 44 and a second caster wheel 50 is connected to the lateral member 42 via the mount 46. Each of the caster wheels 48 and 50 are a wheel assembly with a vertical pivot axis allowing the wheels 48 and 50 to follow the direction of the riding mower (tractor). A push mower connector means 52 provides a connectable and disconnectable connection between the attachment assembly 40 and the push mower 10. A tow connection arm 54 is connected to the lateral member 42. The tow connection arm 54 has a tow connection end 55 for attachment to a tow point of a riding mower via the tow pin 8. The tow connection end 55 advantageously is connected to the remainder of the tow connection arm 54 at a fixed angle. This allows for some connection advantages while still allowing the tow connection arm 54 to be set at one of various different angles relative to the riding mower. With this construction the push mower 10 can be set in various locations relative to the track of the riding mower. For this adjustment, the tow connection arm 54 has an adjustment region 56 with a plurality of adjustment locations. These adjustment locations may advantageously be provided as openings through the connection arm 54. A bracing arm 58 is connected to the lateral member 42 at a connection location 59. The bracing arm 58 is connected to one of the adjustment locations (openings), by a bolt connection, at adjustment region 56 of the tow connection arm 54. By selecting the adjustment location of the adjustment region 56, one of various different push mower tracks can be established, to set an offset track of the push mower 10 relative to the track of the riding mower.

Figure 2:
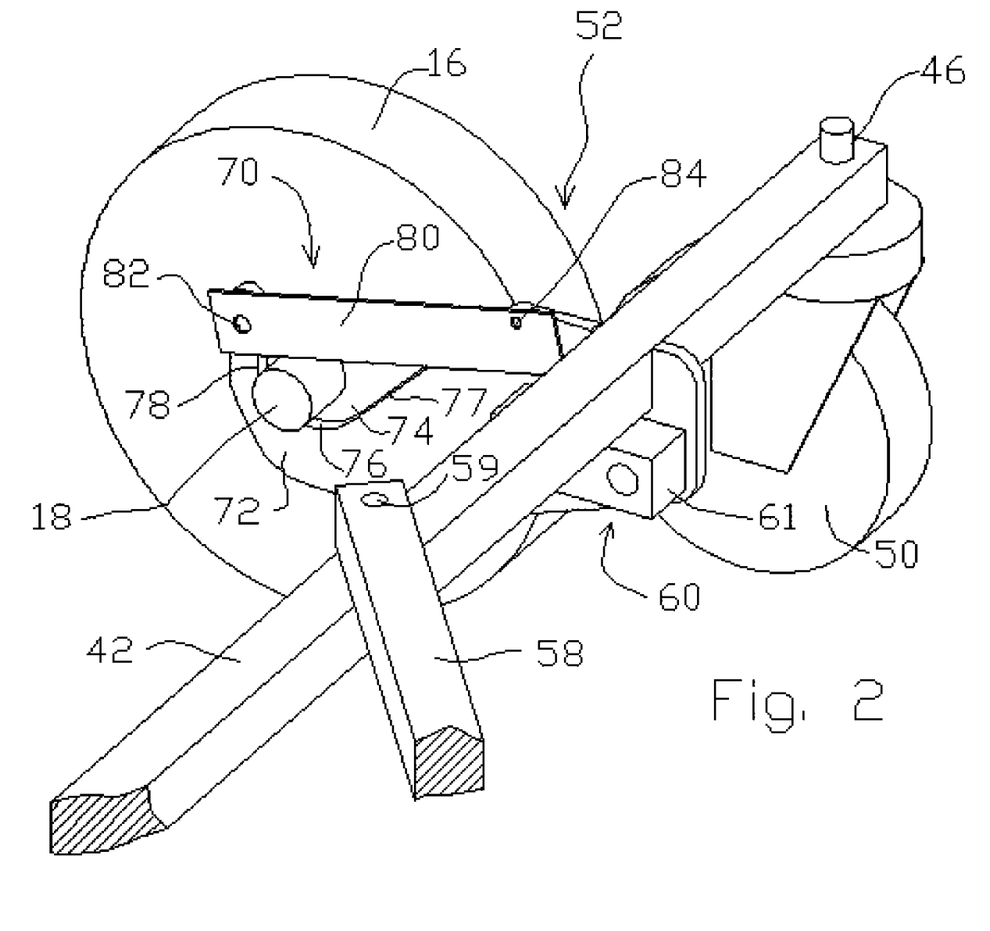
FIG. 2 is a partially cut away view of a portion of the attachment assembly with the push mower connector means according to a first embodiment, showing the frame carrying a left side lateral adjustment device and left side axle connection device according to the invention, the right side lateral adjustment device and right side axle connection device being substantially the same.

FIG. 2 shows a partially cut away enlarged detail view of the lateral member 42 of the attachment assembly 40. The mower connector means 52 is supported by the lateral member 42. The mower connector means 52 according to the first embodiment shown in FIG. 2 includes a lateral adjustment device 60 and an axle connection device 70 mounted to the lateral member 42.

The lateral adjustment device 60 allows the connection device 70 to be mounted at a desired location along lateral member 42 and then to be fixed in a lateral position relative to lateral member 42. The lateral adjustment device 60 allows lateral adjustment of the connection device position to allow for the connection of the attachment assembly 40 to any of various different standard push mowers. The lateral adjustment device 60 includes an adjustment device support 61 that is fixed to the lateral member 42. The connection device 70 of the connector means 52 may then be bolted on the support 61. To change the lateral position of the connection device spacers may be used between the bolt and the support 61. Further, either side of the support 61 can be used to connect the connecting device 70, to provide variations for positioning. The lateral adjustment device 60 may also include an adjustably mounted bracket which can be moved along the lateral member 42 and be fixed in a lateral position, relative to the lateral member 42. The lateral adjustment device 60 allows for the assembly 40 to accommodate various different standard mowers which have different wheel spacing. Although the left side lateral adjustment device 60 is shown in FIG. 2, the features of the right side lateral adjustment device 60 are substantially identical and are therefore not shown in more detail.

FIG. 2 shows a preferred form of the mower connection means 52 which includes an axle connection device 70 at each side. Each axle connection device 70 includes an axle connection bracket 72 which is fixed to the lateral adjustment device 60. Particularly, each bracket 72 is connected to a support 61. Each bracket 72 defines an axle receiving region 74 that is bordered by a lower wall 76, an adjacent front wall 77 and an adjacent rear wall 78. Each bracket 72 may be shaped so as to contract or capture the axle 18 of a respective front wheel 16. The shape can be used to basically maintain the position of the axle 18 in the receiving region 74 during use. Further, the mower can be disengaged from the attachment assembly 40 with little effort. According to the preferred embodiment of FIG. 2 each axle connection device 70 also includes a closure element 80. The closure element 80 is articulated at articulation connection point 82. The closure element 80 can be fixed in a closed position by a locking connection 84. This then prevents the axle 18 from becoming unintentionally disengaged from the axle connection device 70. Although the left side axle connection device 70 is shown, the features of the right side axle connection device 70 are substantially identical (mirror image) and therefore not shown in more detail. With each axle connection device 70 in place each respective wheel 16 is held above the ground, supported by the attachment assembly 40 via the caster wheels 48 and 50 of the attachment assembly 40. This first embodiment of the mower connection means 52 including the left and right axle connection device 70 is particularly advantageous as most standard push mowers have at least a front height adjustment for changing the position of the axles 18 relative to the mower deck 12. With this the front of the mower deck can be initially lowered (slanting forward) such that when the front end of the mower deck 12 is held by the left and right axle connection device 70 the wheels are raised above the ground and the mower deck 12 is substantially level (or can be adjusted to be level).

Figure 3:
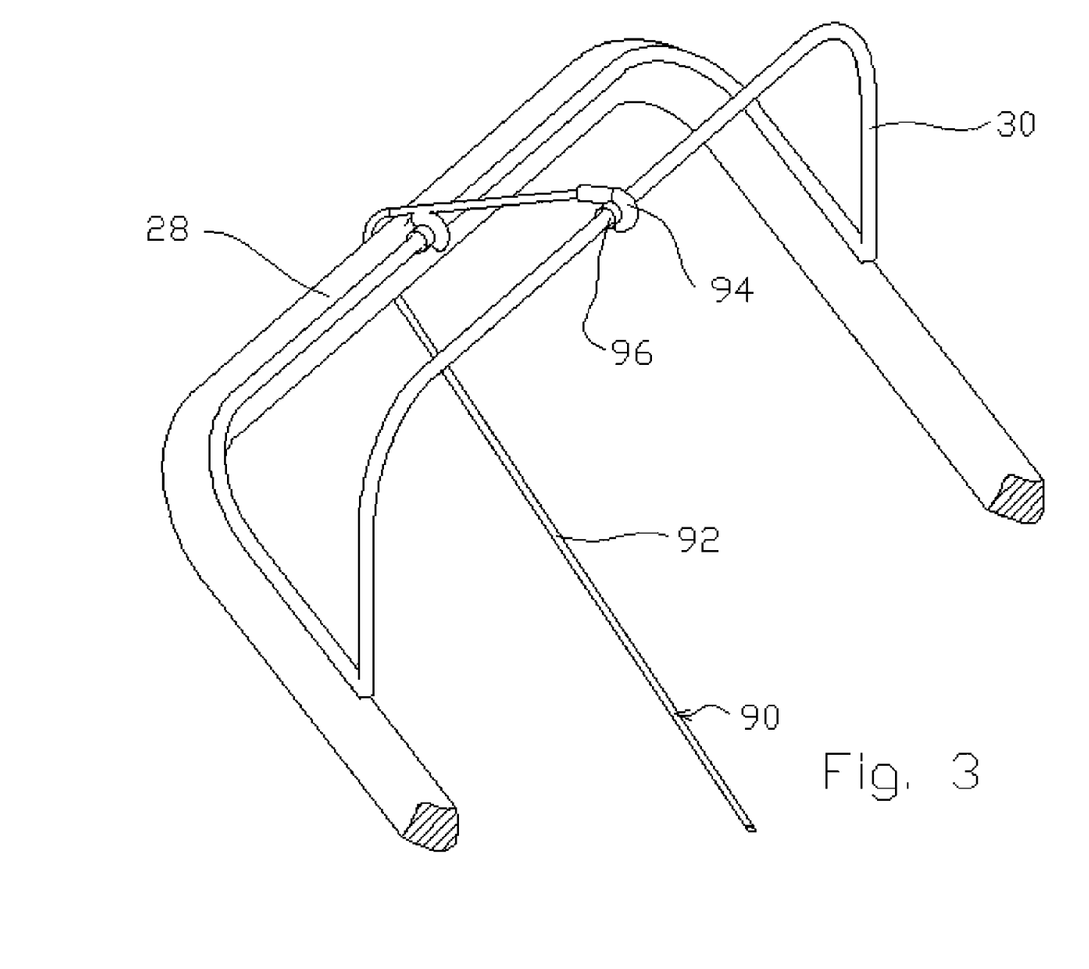
FIG. 3 is a broken away view showing the safety bar engagement device according to the invention.
Figure 4:
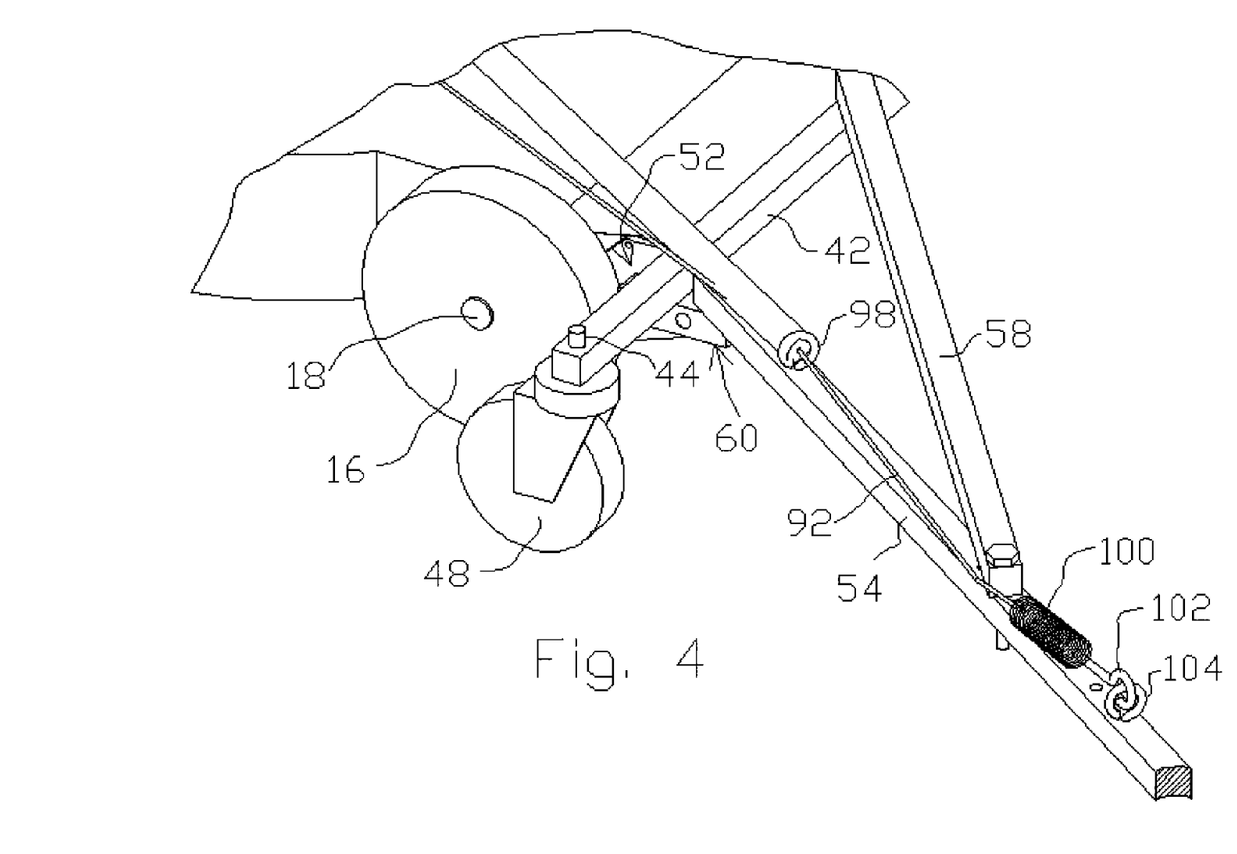
FIG. 4 is a broken away detail view showing the attachment assembly and features of the safety bar engagement device according to the invention.

FIG. 3 shows the upper handle part 28 of the handle 20 as well as the safety bar 30. A safety bar engagement device 90 is provided for maintaining the laterally extending safety bar 30 in the operative position or within an operative range (as shown). The engagement device 90 includes a safety bar engagement cable 92 with a safety bar engagement hook 94. The hook 94 engages the safety bar 30 allowing it to be pulled or maintained toward the direction of the upper handlebar 28. To keep the hook 94 from sliding laterally to the left or right, one or more stop element 96 is applied to one or both sides of the hook 94, in its engaged position on safety bar 30. As seen in FIG. 4, the engagement cable 92 extends through an eye bolt 98, fixed on the tow connection or 54, to a spring 100. The spring 100 has a hook connection 102 which engages an eye bolt 104 which is fixed on the tow connection 54. With this arrangement, the push mower 10 is maintained in an operative state based on the safety bar 30 being in its operative position (being in the operative range of positions). The safety bar 30 may be moved into a stop position by disengaging the hook 102 from the eye bolt 104. The specific features and arrangement of the safety bar engagement device 90, including the cable 92 may be changed to another structure for placing the safety bar 30 in an operative state (including a band clasping the bar and keeping it in the operative range). Further, the cable may extend to the riding mower or to any convenient location (including only a short distance along the mower 10 itself). Additionally, another on-off lever may be incorporated cooperating with cable 92 and/or cooperating with the spring 100 to change the operative state of the push mower 10.

As shown in FIG. 1 an elastic member 110 can be provided extending from the attachment assembly 40 to the handle 20. This elastic element provides some tension to prevent the handle 20 from moving extensively. Elastic member 110 may be a bungee cord strap extending from the middle laterally extending handle part 26 to a connection location at tow connection arm 54. This maintains tension on the handle 20, keeping it from bouncing or vibrating too much during use. Otherwise, the handle will fail from metal fatigue after a period of time without this tension.

The system is used in operation by first providing the push mower 10 of a standard type. The lateral member 42 is positioned adjacent to a front end of the push mower 10 and the lateral adjustment devices 60 are used to position axle connection brackets 72 between the respective wheel 16 and the mower deck 12. The bracket 72 are then fixed to one of the respective supports 61 and each axle connection brackets 72 is engaged with a respective axle 18, by the respective axle 18 being moved into the respective axle receiving regions 74. The closure element 80 of each axle connection device 70 is then moved to a closed position and fixed via locking connection 84. One of the openings that form the adjustment region 56 is then selected and the bracing arm 58 is connected to the tow connection arm 54 by a bolt connection in the adjustment region 56. This then sets the angle of the bracing arm 58 relative to the tow connection arm 54 and thereby sets the track along which the push mower 10 will be pulled by the riding mower. The elastic member 110 is then fixed to the middle handle part 26 and at the fixing location along the connection arm 54. The safety bar engagement cable 92 is connected via cable hook connection 102 engaging eye bolt 104 and engagement hook 94 engaging the safety bar 30. The tow connection arm 54 is then connected to the riding mower with connection end 55 being placed at the tow point and pin 8 engaging the tow connection of the riding mower. The push mower is then started and towed behind the riding mower to increase the cutting width of each pass of the riding mower.

The towed mower 10 can also be quickly disconnected from the attachment assembly 40 and thereby from the riding mower in order to mow areas where the riding mower cannot maneuver properly or to mow areas that are too rough or steep to allow a riding mower to be used. The attachment assembly 40 does not necessarily have to be removed from the mower in order to use it as a push mower. It can be detached from the riding mower and flipped up and beyond vertical and laid back against the engine 14. In that position it is out of the way, more or less, and mowing can be done in the standard fashion, albeit with an extra weight on the front end.

The caster wheels 48 and 50 and lateral member 42 as well as other aspects of the attachment assembly 40 allow the push mower to be towed in any track position relative to the riding mower without extensive chattering or lateral movement. With most uses (such as with a 42 inch push mower deck 12) the device can save approximately 50% of the time required to mow an area.

Figure 5:
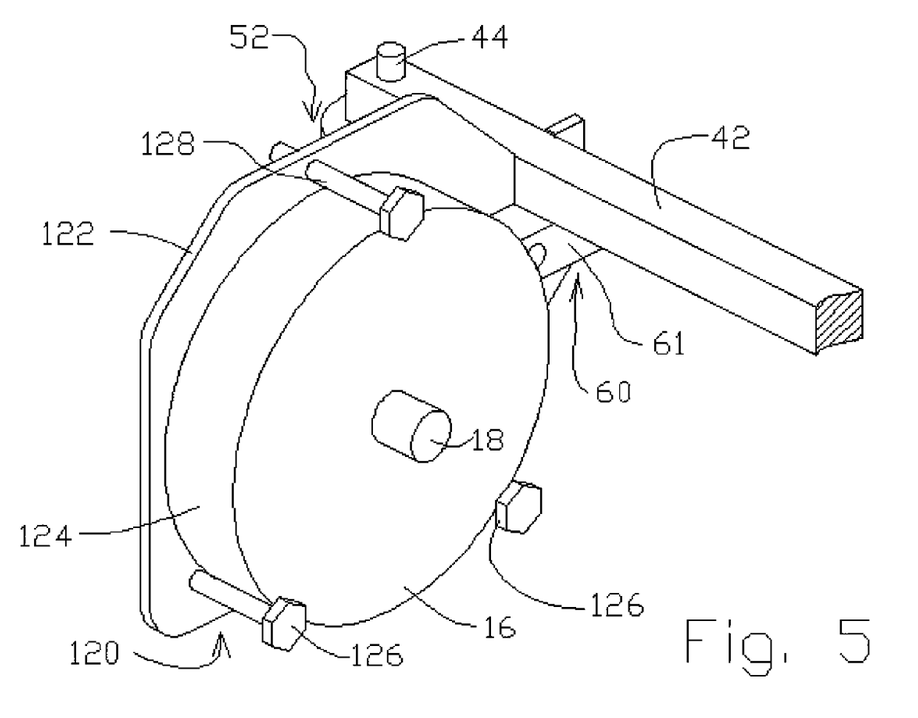
FIG. 5 is a partially cut away view of a portion of the attachment assembly with the push mower connector means according to a second embodiment showing the frame carrying a right side lateral adjustment device and right side wheel connection device according to the invention, the left side lateral adjustment device and left side wheel connection device being substantially the same.

FIG. 5 shows a second embodiment with a push mower connector means 52'. The remaining structural features according to the second embodiment are the same as those shown in FIGS. 1, 3 and 4. Further, the push mower connector means 52' according to the second embodiment includes a lateral adjustment device 60 which is the same as the first embodiment. However, instead of the push mower connector means 52 as shown in FIG. 2, a push mower connector means 52' as shown in FIG. 5 is provided. According to the second embodiment, the push mower connector means 52' includes a wheel connection device generally designated 120. The wheel connection device 120 includes a wheel connection bracket 122 that is fastened to the adjustment device support 61. As with the first embodiment bolts are used to bolt the wheel connection bracket 122 to the adjustment device support 61. To adjust the lateral position spacers (such as washers) are used between the connection bracket 122 and the support 61. The wheel connection device 120 provides a wheel receiving region 124 that is delimited by lower supports 126 and an additional support 128. For each of the supports 126 and 128, the head ends 127 can be optionally be present. These are not required as the wheels 16 are captured in the areas 124 from each side. The head end 127 can at least be absent from the additional support 128. These head ends 127 provide a good positioning of the respective wheel 16 for holding it in place, even with excessive vibration of the mower deck 12. However the presence of head ends 127 on each of the supports 126 and 128 requires the removal of one support 126 or 128 for receiving the wheel in the region 124. To connect the wheel connection device 120 to a left or right front wheel 16, the wheel 16 is placed in the wheel receiving region 124 and the connection bracket 122 is connected to the support 61 with the appropriate lateral spacing. This procedure is followed on the opposite side with the lateral spacing chosen such that the wheel 16 cannot be withdrawn from the respective wheel receiving region 124. This essentially captures the opposite front wheels between the opposing left and right connection bracket 122 of the respective left and right wheel connection device 120. The bracket 122 of each wheel connection device 120 is dimensioned so as to hold the respective wheel 16 above the ground, supported by the attachment assembly 40 via the caster wheels 48 and 50 of the attachment assembly 40.

Figure 6:
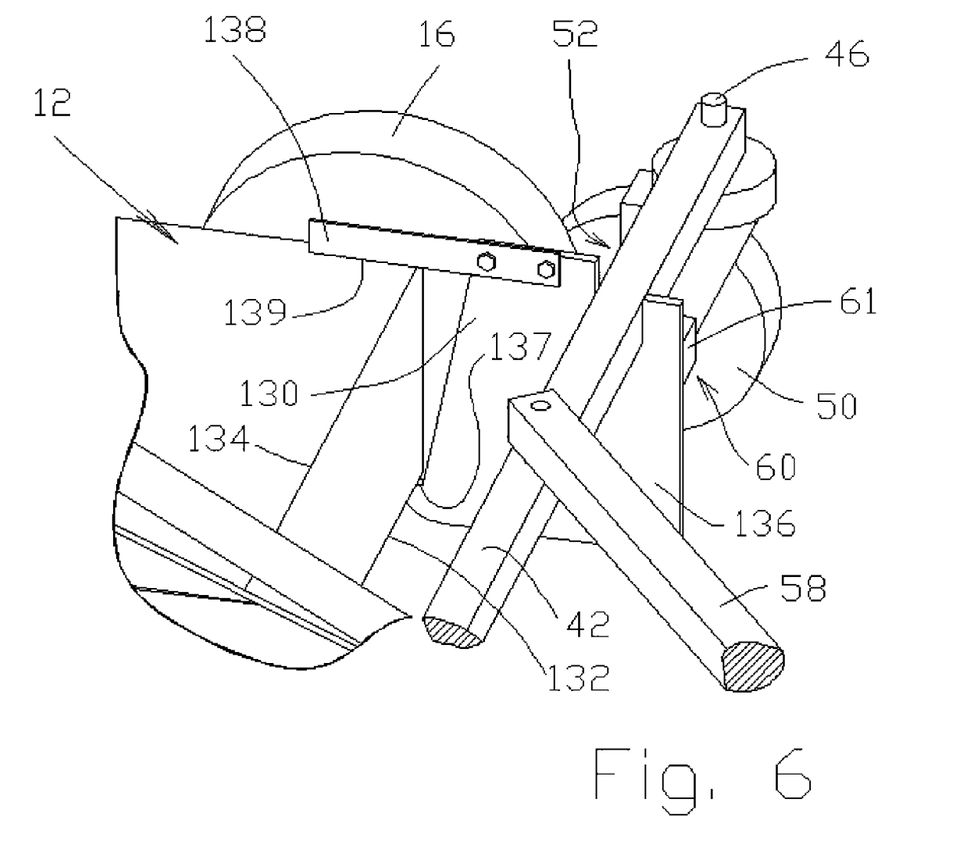
FIG. 6 is a partially cut away top view of a portion of the attachment assembly with the push mower connector means according to a third embodiment showing the frame carrying a right side lateral adjustment device and right side mower deck connection device according to the invention, the left side lateral adjustment device and left side mower deck connection device being substantially the same.
Figure 7:
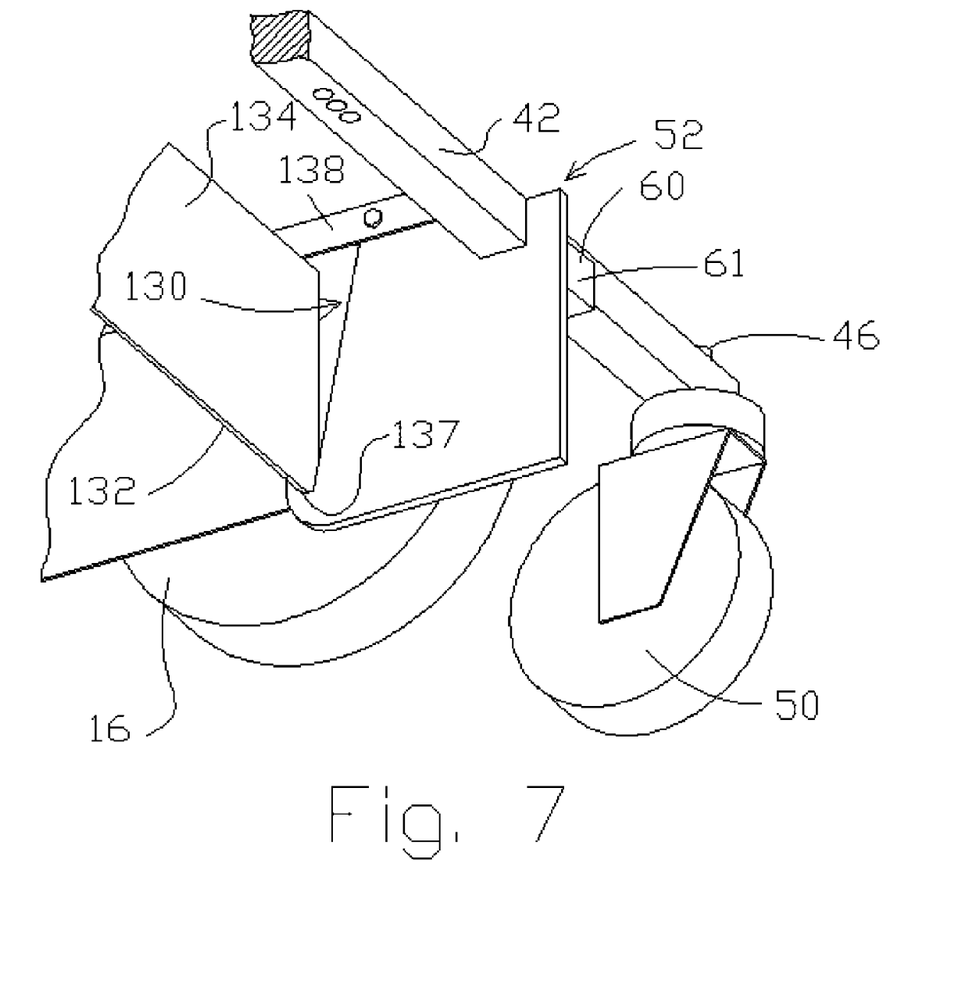
FIG. 7 is a partially cut away bottom view of a portion of the attachment assembly with the push mower connector means according to the third embodiment according to the invention.

FIGS. 6 and 7 show a third embodiment with a push mower connector means 52". The remaining structural features according to the third embodiment are the same as those shown in FIGS. 1, 3 and 4. Further, the push mower connector means 52" according to the third embodiment includes a lateral adjustment device 60 which is the same as the first embodiment. However, instead of the push mower connector means 52 as shown in FIG. 2, the push mower connector means 52" as shown in FIGS. 6 and 7 is provided. According to the third embodiment, the push mower connector 52" includes a mower deck connection device generally designated 130. The mower deck connection device 130 is adapted to grasp a mower deck lower edge 132 and preferably also a mower deck upper edge 134. The mower deck connection device 130 includes a mower deck connection bracket 136 that defines a mower deck lower edge support 137. An additional mower deck connection support 138 may also be provided to define a mower deck upper edge support 139. To connect the attachment assembly 40 to the push mower 10 according to the third embodiment, each connection device 130 is positioned with appropriate lateral spacing such that the lower edge to port 137 engages the deck lower edge 132. As with the other embodiments the lateral adjustment device 60 may be used by adding spacers adjacent to the support 61 to adjust the position of each bracket 130 relative to the respective support 61. The additional mower deck connection support 138 is then positioned to contact the mower deck upper edge 132. This essentially captures the mower deck to hold and support the mower deck 12 with each connection device 130 so as to hold the respective wheel 16 above the ground, supported by the attachment assembly 40 via the caster wheels 48 and 50 of the attachment assembly 40.

While specific embodiments of the invention have been shown and described in detail to illustrate the application of the principles of the invention, it will be understood that the invention may be embodied otherwise without departing from such principles.

What is claimed is:

1. A tow behind mower attachment system comprising:
    a push mower having a mower deck with four wheels including a right front wheel having a right front axle, a left front wheel having a left front axle, a right rear wheel having a right rear axle and a left rear wheel having a left rear axle, said push mower having unmodified wheel and axle surface features defined by said four wheels, said right front axle and said left front axle, said right rear axle and said left rear axle;
    an attachment assembly having caster mounts and caster wheels connected to said caster mounts for pivoting relative to said attachment assembly; and
    push mower connector means with an engagement interface with a shape complementary to one or more of said wheel and axle surface features for engaging said one or more of said wheel and axle surface features for connecting and fixing said attachment assembly to said push mower via one or more of said wheel and axle surface features whereby said push mower as an unmodified mower may be used with the attachment assembly via said push mower connector means.

2. A tow behind mower attachment system according to claim 1, wherein said push mower connector means engages said one or more of said wheel and axle surface features for supporting an end of said push mower deck on said caster wheels for positioning at least two of said four wheels in a supported state in a raised position off of the ground.

3. A tow behind mower attachment system according to claim 2, wherein said attachment assembly comprises:
   a lateral member with said caster mount receiving said caster wheel and another caster mount connected to another caster wheel;
   a tow connection arm connected to said lateral member and having a tow connection end for attachment to a tow point of a riding mower, said tow connection arm having an adjustment region with a plurality of adjustment locations; and
   a bracing arm cooperating with said lateral member and aid tow connection to form a frame and connected to one of said adjustment locations at said adjustment region of said tow connection arm for establishing an offset track of the push mower relative to the track of the riding mower.

4. A tow behind mower attachment system according to claim 2, wherein said push mower connector means comprises:
   a right side lateral adjustment device for changing a right lateral mounting location of a right portion of said engagement interface within one of a plurality of lateral positions for adjusting a lateral position of said right portion of said engagement interface relative to one or more of said wheel and axle surface features; and
   a left side lateral adjustment device for changing a left lateral mounting location of a left portion of said engagement interface within one of a plurality of lateral positions for adjusting a lateral position of said left portion of said engagement interface relative to one or more of said wheel and axle surface features.

5. A tow behind mower attachment system according to claim 4, wherein said push mower connector means comprises:
   a right axle connection part mounted to said right lateral mounting location, said right axle connection part forming said right portion of said engagement interface for engaging the right axle of the push mower, as said one or more of said wheel and axle surface features, for connecting said attachment assembly to said push mower; and
   a left axle connection part mounted to said left lateral mounting location, said left axle connection part forming said left portion of said engagement interface for engaging the left axle of the push mower, as said one or more of said wheel and axle surface features, for connecting said attachment assembly to said push mower.

6. A tow behind mower attachment system according to claim 5, wherein said right axle connection part and said left axle connection part each comprise:
   a bracket defining an axle receiving region with at least a lower wall and adjacent front and rear walls; and
   a closure element articulated at one end to said bracket and with an opposite connection and for connection to said bracket to maintain the push mower axle in the axle receiving region.

7. A tow behind mower attachment system according to claim 4, wherein said push mower connector means comprises:
   a right wheel connection part mounted to said right lateral mounting location, said right wheel connection part forming said right portion of said engagement interface for engaging the right wheel of the push mower, as said one or more of said wheel and axle surface features, for connecting said attachment assembly to said push mower; and
   a left wheel connection part mounted to said left lateral mounting location, said left wheel connection part forming said left portion of said engagement interface for engaging the left wheel of the push mower, as said one or more of said wheel and axle surface features, for connecting said attachment assembly to said push mower.

8. A tow behind mower attachment system according to claim 7, wherein said right wheel connection part and said left wheel connection part each comprise:
   a bracket defining a wheel receiving region;
   a lower support connected to said bracket; and
   another support connected to said bracket, said lower support and said another support cooperating to support a respective wheel in said wheel receiving region.

9. A tow behind mower attachment system, comprising:
   a push mower having a mower deck with four wheels including a right front wheel having a right front axle, a left front wheel having a left front axle, a right rear wheel having a right rear axle and a left rear wheel having a left rear axle, said push mower having unmodified surface features defined by said mower deck, said four wheels, said right front axle and said left front axle, said right rear axle and said left rear axle;
   an attachment assembly having caster mounts and caster wheels connected to said caster mounts for pivoting relative to said attachment assembly;
   push mower connector means with an engagement interface with a shape complementary to one or more of said surface features for engaging said one or more of said surface features for connecting and fixing said attachment assembly to said push mower whereby said push mower as an unmodified mower may be used with the attachment assembly via said push mower connector means, wherein:
   said push mower includes an extending handle with a right side attachment connected to said mower deck and with a left side attachment connected to said mower deck, an upper laterally extending handle part and a laterally extending safety bar movable between a safety position for disabling the push mower and an engaged position for operation of the push mower;
   a safety bar engagement device for maintaining said safety bar in said engaged position for operation of said push mower, wherein said safety bar engagement device comprises:
   a cable connected to said safety bar;
   a connection point established along one of said attachment assembly, said mower deck or a part connected to said mower deck, said connection point for connecting said cable for tensioning said cable for maintaining said safety bar in the engaged position for operation of the push mower.

10. A tow behind mower attachment system according to claim 9, wherein said safety bar engagement device further comprises: a spring connected to said cable between said connection point and said cable for applying a spring force to said safety bar in said engaged position for operation of said push mower.

11. A tow behind mower attachment system according to claim 9, further comprising an elastic member connected to said extending handle for maintaining tension on said extending handle.

12. A tow behind mower attachment system comprising:
- a push mower having an unmodified mower deck with no additional openings or holes in mower deck as compared to a stock original state and with four unmodified wheels including a right front wheel having an unmodified right front axle, a left front wheel having an unmodified left front axle, a right rear wheel having an unmodified right rear axle and a left rear wheel having an unmodified left rear axle, the push mower having unmodified surface features defined by said unmodified mower deck, said four unmodified wheels, said unmodified right front axle and said unmodified left front axle, said unmodified right rear axle and said unmodified left rear axle whereby said mower is in or substantially in a stock original state;
- an attachment assembly having caster mounts and caster wheels connected to said caster mounts for pivoting relative to said attachment assembly; and
- unmodified push mower connection means for engaging one or more of said surface features for connecting said attachment assembly to said unmodified push mower, said push mower connector means including a right side lateral adjustment device for changing a right lateral mounting location within one of a plurality of lateral positions and a left side lateral adjustment device for changing a left lateral mounting location within one of a plurality of lateral positions, said push mower connector means having an engagement interface engaging said one or more of said unmodified surface features for supporting a front end of said push mower deck on said caster wheels for positioning at least two of said four wheels supported in a raised position off of the ground.

13. A tow behind mower attachment system according to claim 12, wherein said push mower connection means comprises:
- a right axle connection part mounted to said right lateral mounting location, said right axle connection part forming a right portion of said engagement interface for engaging the right axle of the push mower, as said one or more of said wheel and axle surface features, for connecting said attachment assembly to said push mower; and
- a left axle connection part mounted to said left lateral mounting location, said left axle connection part forming a left portion of said engagement interface for engaging the left axle of the push mower, as said one or more of said unmodified surface features, for connecting said attachment assembly to said push mower.

14. A tow behind mower attachment system according to claim 12, wherein said push mower connection means comprises:
- a right wheel connection part mounted to said right lateral mounting location, said right wheel connection part forming said right portion of said engagement interface for engaging the right wheel of the push mower, as said one or more of said unmodified surface features, for connecting said attachment assembly to said push mower; and
- a left wheel connection part mounted to said left lateral mounting location, said left wheel connection part forming said left portion of said engagement interface for engaging the left wheel of the push mower, as said one or more of said unmodified surface features, for connecting said attachment assembly to said push mower.

15. A tow behind mower attachment system according to claim 12, wherein said attachment assembly comprises:
- a lateral member with said caster mount receiving said caster wheel and another caster mount connected to another caster wheel;
- a tow connection arm connected to said lateral member and having a tow connection end for attachment to a tow point of a riding mower, said tow connection arm having an adjustment region with a plurality of adjustment locations; and
- a bracing arm connected to said lateral member and connected to one of said adjustment locations at said adjustment region of said tow connection arm for establishing an offset track of the push mower relative to the track of the riding mower.

\* \* \* \* \*